United States Patent
Matsuo et al.

(10) Patent No.: US 9,347,341 B2
(45) Date of Patent: May 24, 2016

(54) APPARATUS AND METHOD FOR CONTROLLING VARIABLE VALVE TIMING MECHANISM

(71) Applicant: Hitachi Automotive Systems, Ltd., Hitachinaka-shi, Ibaraki (JP)

(72) Inventors: Nobuhiko Matsuo, Isesaki (JP); Kenichi Machida, Isesaki (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 314 days.

(21) Appl. No.: 14/027,922

(22) Filed: Sep. 16, 2013

(65) Prior Publication Data

US 2014/0076251 A1 Mar. 20, 2014

(30) Foreign Application Priority Data

Sep. 19, 2012 (JP) ................................. 2012-206300

(51) Int. Cl.
| | |
|---|---|
| F02D 13/00 | (2006.01) |
| F01L 1/34 | (2006.01) |
| F02D 41/06 | (2006.01) |
| F02D 13/02 | (2006.01) |
| F01L 1/344 | (2006.01) |
| F02D 41/04 | (2006.01) |
| F02D 41/14 | (2006.01) |
| F02D 41/00 | (2006.01) |

(52) U.S. Cl.
CPC ............... *F01L 1/34* (2013.01); *F02D 13/0238* (2013.01); *F02D 13/0261* (2013.01); *F02D 41/062* (2013.01); *F01L 1/344* (2013.01); *F01L 2820/032* (2013.01); *F02D 41/042* (2013.01); *F02D 41/1401* (2013.01); *F02D 2041/001* (2013.01); *Y02T 10/18* (2013.01)

(58) Field of Classification Search
CPC ........................ F01L 2800/00; F02D 2041/001
USPC .......................... 123/345, 347, 348, 349, 350, 123/90.15–90.16
See application file for complete search history.

(56) References Cited

U.S. PATENT DOCUMENTS

| | | | | |
|---|---|---|---|---|
| 5,626,108 | A | * 5/1997 | Kato | ................... F01L 1/34406 123/90.15 |
| 2004/0083999 | A1 | * 5/2004 | Miyakoshi | .............. F01L 1/352 123/90.17 |
| 2004/0129250 | A1 | * 7/2004 | Iizuka | ..................... F01L 1/022 123/346 |

(Continued)

FOREIGN PATENT DOCUMENTS

| | | |
|---|---|---|
| JP | 2005-299640 A | 10/2005 |
| JP | 2006-514222 A | 4/2006 |

(Continued)

OTHER PUBLICATIONS

Japanese Office Action issued in counterpart Japanese Application No. 2012-206300 dated Jan. 5, 2016 with English-language translation (five (5) pages).

*Primary Examiner* — John Kwon
(74) *Attorney, Agent, or Firm* — Crowell & Moring LLP

(57) ABSTRACT

An apparatus for controlling a variable valve timing mechanism includes an electronic controller which includes a microcomputer converges a valve timing of a variable valve timing mechanism to a target changing amount based on a deviation between the target changing amount and an output of a sensor for detecting a changing amount of the valve timing.

17 Claims, 9 Drawing Sheets

(56) References Cited

U.S. PATENT DOCUMENTS

| | | |
|---|---|---|
| 2005/0205030 A1 | 9/2005 | Okamoto et al. |
| 2006/0144363 A1 | 7/2006 | Beer et al. |
| 2006/0225700 A1 | 10/2006 | Ramappan et al. |
| 2007/0221150 A1* | 9/2007 | Inoue ............ F01L 1/352 123/90.17 |
| 2007/0227482 A1* | 10/2007 | Inoue ............ F01L 1/024 123/90.17 |
| 2008/0257292 A1 | 10/2008 | Inoue |
| 2009/0210137 A1 | 8/2009 | Kokubo et al. |
| 2009/0254263 A1* | 10/2009 | Shimizu ............ F01L 13/0021 701/104 |
| 2010/0012061 A1* | 1/2010 | Mashiki ............ F01L 1/344 123/90.17 |

FOREIGN PATENT DOCUMENTS

| | | |
|---|---|---|
| JP | 2007-187447 A | 7/2007 |
| JP | 2008-267174 A | 11/2008 |
| JP | 2009-13975 A | 1/2009 |
| JP | 2009-197591 A | 9/2009 |

\* cited by examiner

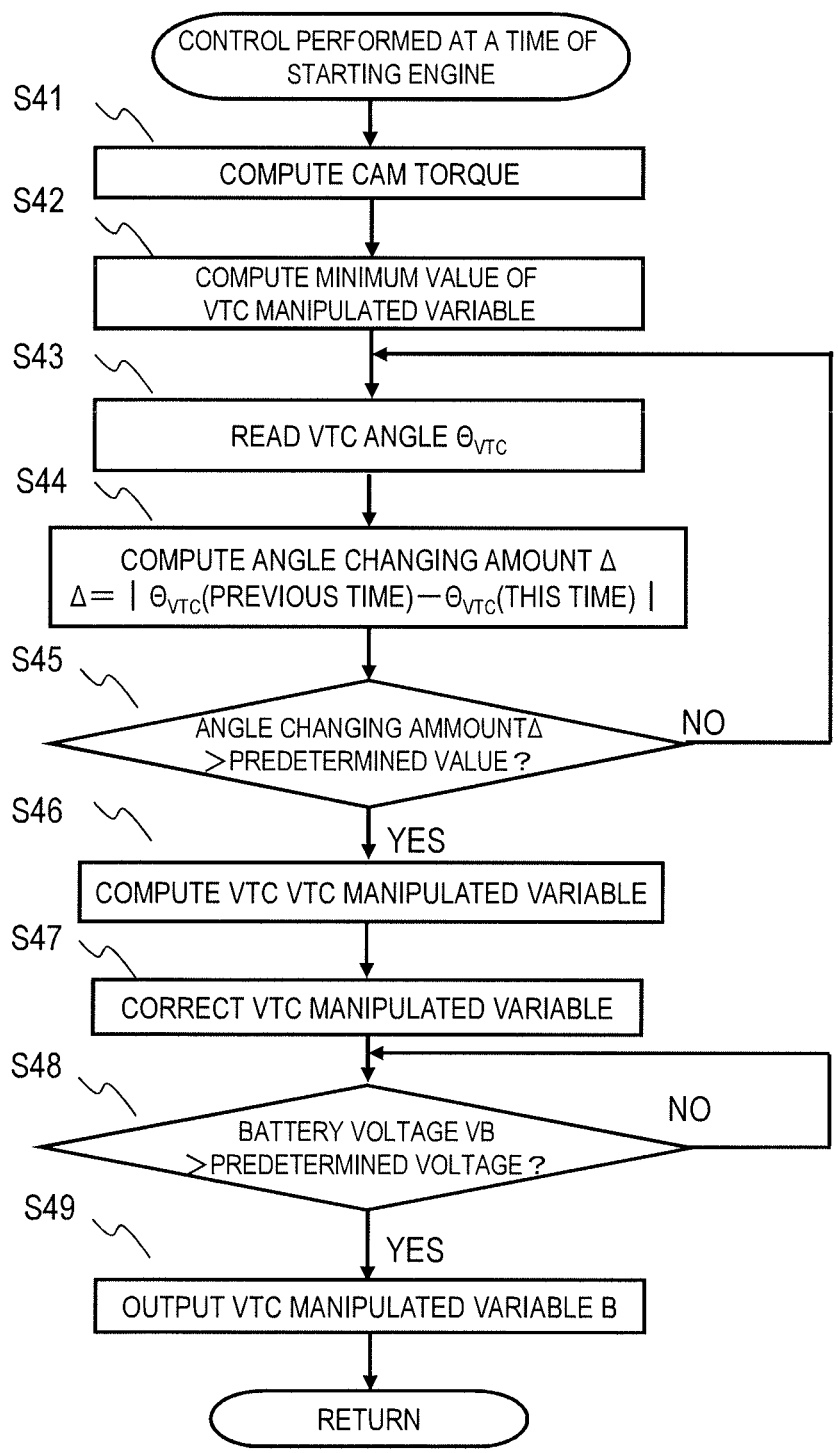

US 9,347,341 B2

APPARATUS AND METHOD FOR CONTROLLING VARIABLE VALVE TIMING MECHANISM

BACKGROUND OF THE INVENTION

1. Field of the Invention

The present invention relates to an apparatus and a method for controlling a variable valve timing mechanism (Valve Timing Control System: VTC), which changes rotational phase of a cam shaft with respect to a crank shaft, thereby changing a valve timing (open and close timing) of at least one of an intake valve and an exhaust valve.

2. Description of Related Art

In order to change valve timing according to an engine operating condition, a VTC is known to public, which changes a rotational phase of a cam shaft with respect to a crank shaft by an actuator. With respect to an engine having a VTC, Japanese Laid-open (Kokai) Patent Application Publication No. 2009-13975 discloses a technique of changing a valve timing so as to be suited to start of an engine when the engine is stopped, thereby ensuring an engine-start performance. Since a VTC cannot change the valve timing when the engine is stopped, on detecting rotation of a crank shaft, a feedback-control of the cam shaft is started based on deviation of an actual angle from a target angle.

Along with rotation of the cam shaft, a VTC attached to the tip of the cam shaft receives an alternate torque (cam torque) constituted by a reaction force of a valve spring and an inertia force of the mass of a moving portion. In the method of starting a feedback-control on detecting rotation of the crank shaft, since there may be a delay of starting the feedback-control from a timing at which the engine is actually started, the valve timing may significantly deviate from a target angle by the time of starting the feedback-control due to the cam torque at the engine starting.

SUMMARY OF THE INVENTION

An apparatus for control a VTC which changes valve timing has a sensor for detecting a changing amount of valve timing, in which the valve timing is converged to a target changing amount according to a deviation of the output of the sensor from the target changing amount.

Other objects and features of aspects of the present invention will be understood from the following description with reference to the accompanying drawings.

BRIEF DESCRIPTION OF THE DRAWINGS

FIG. 10 is a flowchart illustrating another subroutine of a control program executed at a time of starting the engine.

DESCRIPTION OF THE PREFERRED EMBODIMENTS

Hereunder, embodiments for carrying out the present invention will be explained in detail with reference to the attached drawings.

Figure 1:
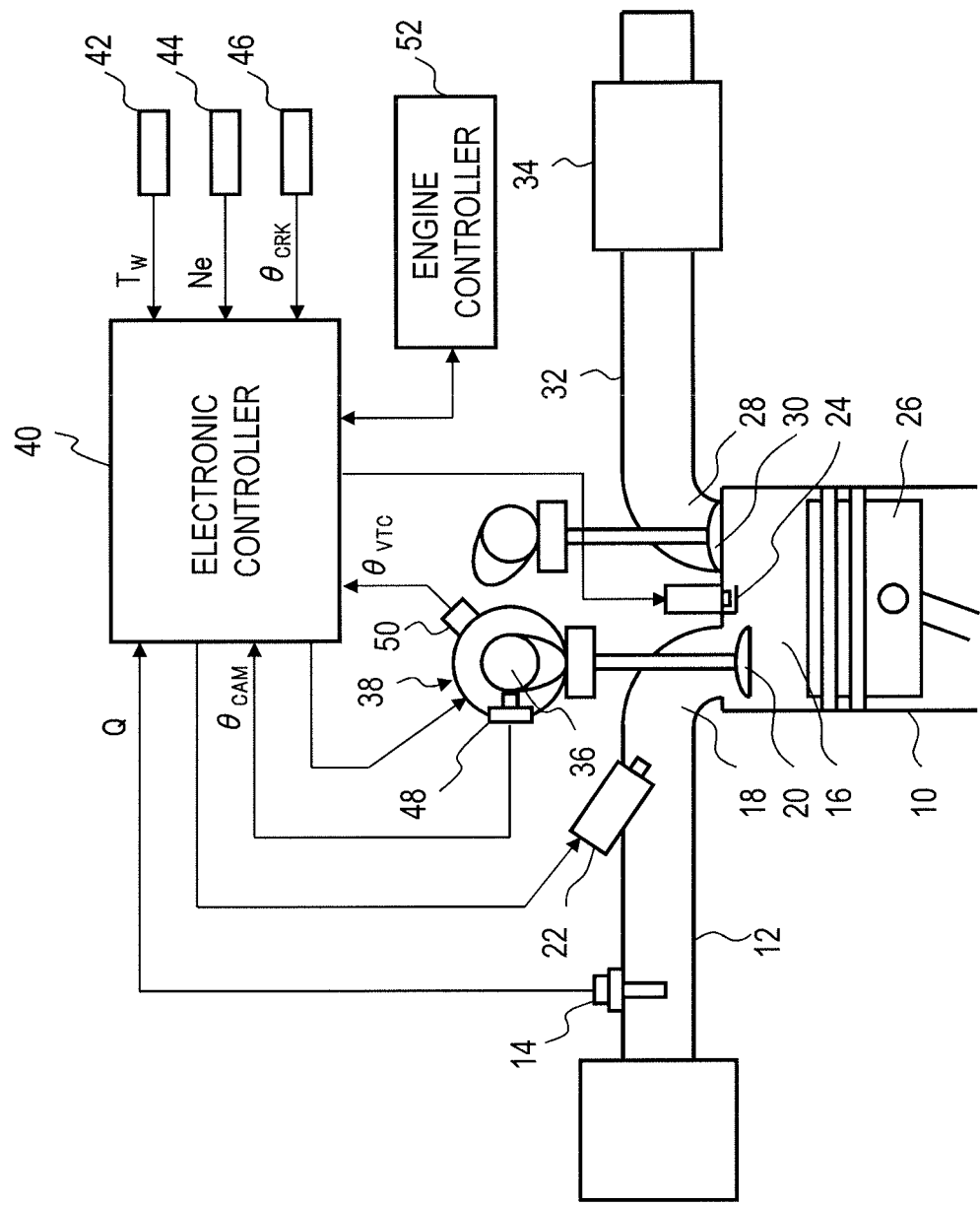
FIG. 1 is a construction view illustrating an engine system for a vehicle.

FIG. 1 illustrates a construction of an engine system for a vehicle, to which the controller for a VTC according to this embodiment is applied.

Engine 10 is, for example, an in-line four cylinder gasoline engine having an intake pipe 12 for introducing an intake air to each cylinder, provided with an intake air flow rate sensor 14 for detecting an intake air flow rate Q as an example of load of engine 10. As intake air flow rate sensor 14, for example, a flow meter such as a heat ray type flow meter may be employed. Here, as the load of engine 10, instead of the intake air flow rate Q, for example, a state quantity such as intake air negative pressure, super charging pressure, throttle opening or accelerator opening, that closely relates to torque, may be used.

An intake port 18 for drawing an intake air to a combustion chamber 16 of each cylinder, is provided with an intake valve 20 for opening and closing intake port 18. To an intake pipe 12 on the intake air flow upstream side of the intake valve 20, a fuel injector 22 for injecting a fuel toward intake port 18 is attached. Fuel injector 22 is an electromagnetic injector configured so that when an electromagnetic valve is energized, a magnetic attraction force is produced to lift a valve body, that has been pressed toward a closing position by a spring, thereby opening the valve to inject a fuel. To fuel injector 22, a fuel having an adjusted predetermined pressure is supplied so that the fuel in an amount linear to a valve-open period is injected.

The fuel injected from fuel injector 22 is drew through a gap between intake port 18 and intake valve 20 into combustion chamber 16 together with the intake air, and is spark-ignited by an ignition plug 24 and combusted, and a pressure produced by the combustion presses down a piston 26 toward a crank shaft (not illustrated), to rotate the crank shaft.

Further, to an exhaust port 28 for discharging an exhaust gas, an exhaust valve 30 for opening and closing exhaust port 28 is provided, and when exhaust valve 30 is opened, the exhaust gas is discharged through a gap between exhaust port 28 and exhaust valve 30 to an exhaust pipe 32. In exhaust pipe 32, a catalyst converter 34 is provided to purify a harmful material in the exhaust gas into a harmless material, and thereafter, the exhaust gas is discharged from an opening at end of exhaust pipe 32 to the atmospheric air. Here, as catalyst converter 34, for example, a three-way catalyst may be employed, which can simultaneously change CO (carbon monoxide), HC (hydrocarbon) and $NO_x$ (nitric oxide) in the exhaust gas into harmless materials.

Figure 2:
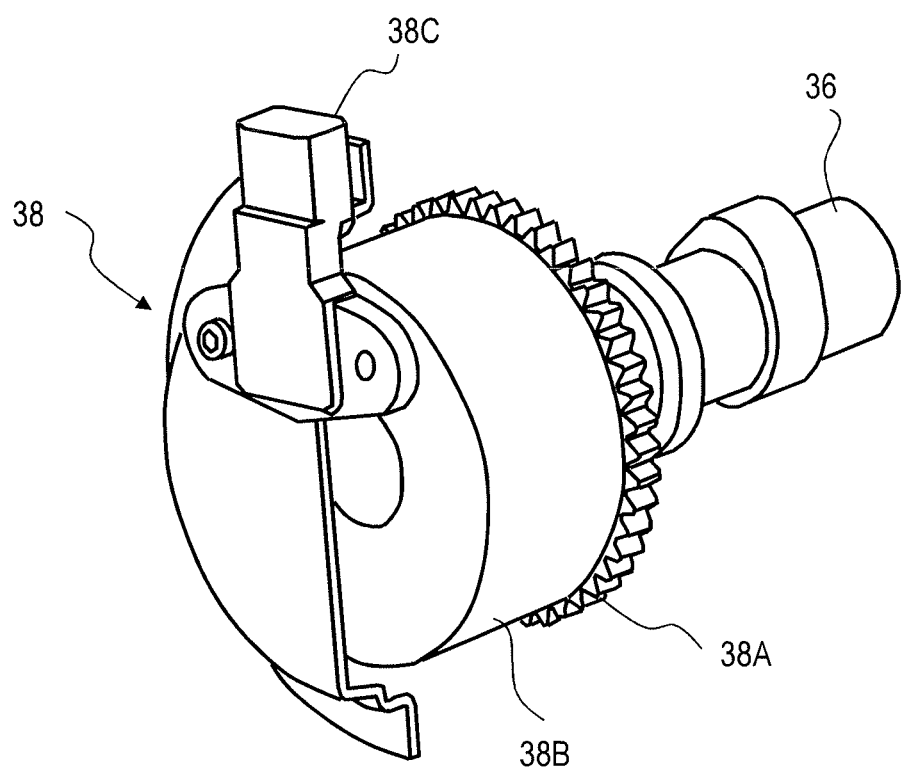
FIG. 2 is a perspective view illustrating a detail of a VTC.

To an end portion of an intake cam shaft 36 for opening and closing intake valve 20, a VTC 38 is attached, which changes a rotation phase of intake cam shaft 36 with respect to the crank shaft, thereby changing valve timing of intake valve 20. VTC 38 has, as illustrated in FIG. 2, an electric motor 38B (electric actuator) which includes a reduction gear unit and is integrated with a cam sprocket 38A around which a cam chain for propagating a rotational drive force of the crank shaft is wound, and electric motor 38B relatively rotates intake cam shaft 36 with respect to cam sprocket 38A, to thereby advance or delay the valve timing. Here, in FIG. 2, a symbol 38C denotes a connector for connecting with a harness for supplying an electric power to electric motor 38B.

Here, VTC 38 is not limited to one having the construction illustrated in FIG. 2, but it may have any construction capable of changing valve timing by any of various actuators such as electric motors or hydraulic motors. Furthermore, it is not limited that VTC 38 is attached to the intake valve, but it is sufficient that VTC 38 is attached to at least one of intake valve 20 and exhaust valve 30.

Fuel injector 22, ignition plug 24 and VTC 38 are controlled by an electronic controller 40 having a microcomputer. Electronic controller 40 receives signals from various sensors, and determines manipulated variables for fuel injector 22, ignition plug 24 and VTC 38 according to a pre-stored control program to output the determined manipulated variables. In a fuel injection control by fuel injector 22, for example, a so-called "sequential injection control" is performed, in which fuel injection in each cylinder is performed individually to correspond to an intake step of the cylinder. Here, the control of VTC 38 may be performed by an electronic controller separated from electronic controller 40.

Electronic controller 40 receives, in addition to the signal of intake flow rate sensor 14, signals from a water temperature sensor 42 for detecting coolant temperature (water temperature) Tw for engine 10, a rotation speed sensor 44 for detecting rotation speed Ne of engine 10, a crank angle sensor 46 for detecting a rotation angle (rotated from a reference position) $\theta_{CRK}$ of the crank shaft, a cam angle sensor 48 for detecting a rotation angle $\theta_{CAM}$ of intake cam shaft 36, and a VTC angle sensor 50 for detecting a changing angle (VTC angle) $\theta_{VTC}$ of valve timing by VTC 38. Furthermore, electronic controller 40 is, for example, connected via an in-vehicle network such as CAN (Controller Area Network) to an engine controller 52 for electronically controlling engine 10, so as to receive ON and OFF signals of a starter switch. As VTC angle sensor 50, for example, a sensor continuously outputting a rotation angle at every unit angle may be employed so as to allow detection of changing angle $\theta_{VTC}$ at an optional timing.

Here, VTC angle sensor 50 may be mentioned as an example of the sensor for detecting the changing amount of valve timing.

Here, as VTC angle sensor 50, crank angle sensor 46 and cam angle sensor 48 continuously outputting a rotation angle at every unit angle may be employed to detect VTC angle $\theta_{VTC}$ indirectly based on outputs of these sensors. Furthermore, intake flow rate Q, water temperature Tw, rotation speed Ne, rotation angle $\theta_{CRK}$ of crank shaft and rotation angle $\theta_{CAM}$ of cam shaft 36 may be read from engine controller 52 instead of reading them from respective sensors.

In addition to the control of VTC 38 to be described later, electronic controller 40 controls fuel injector 22 and ignition plug 24 in the following manner. That is, electronic controller 40 respectively reads intake flow rate Q and rotation speed Ne from intake flow rate sensor 14 and rotation speed sensor 44, and based on them, computes a basic fuel injection amount according to an engine operation state. Furthermore, electronic controller 40 reads water temperature Tw from water temperature sensor 42, and corrects the basic fuel injection amount by water temperature Tw etc. to compute a corrected fuel injection amount. Furthermore, electronic controller 40 makes fuel injector 22 inject a fuel in the fuel injection amount at a timing according to the engine operation state, and makes ignition plug 24 appropriately actuate to ignite and burn a mixed gas of fuel and intake air. Here, electronic controller 40 reads an air-fuel ratio from an air-fuel ratio sensor which is not illustrated, and feedback-controls fuel injector 22 so that the air-fuel ratio in an exhaust gas becomes close to a theoretical air-fuel ratio.

Figure 3:
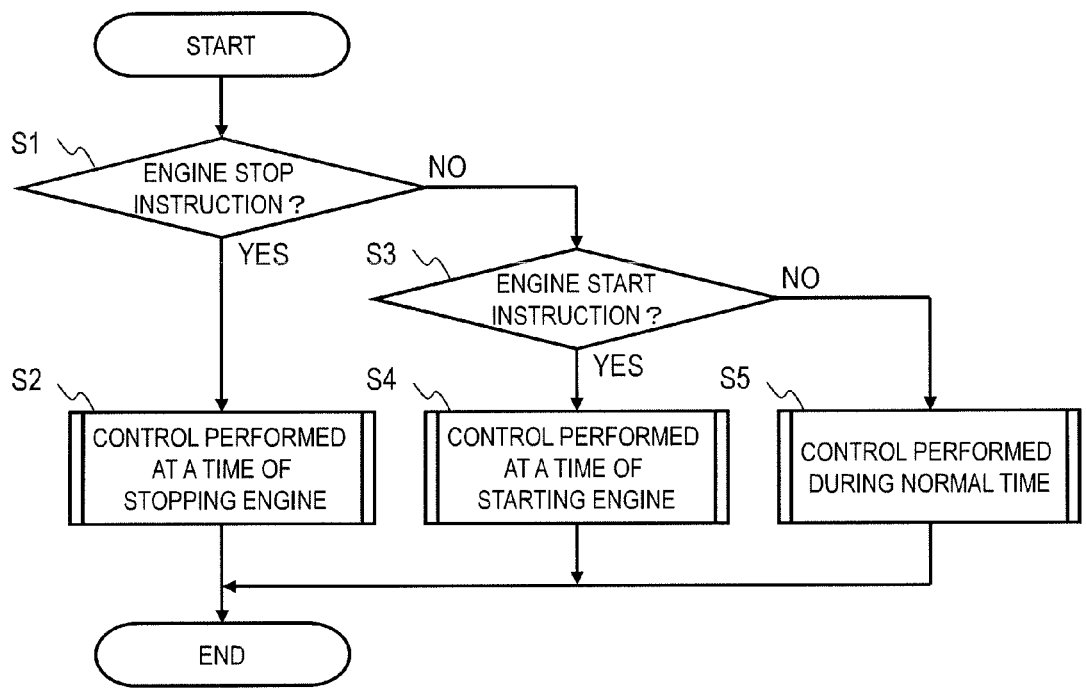
FIG. 3 is a flowchart illustrating a main routine of a control program.

FIG. 3 illustrates an example of main routine of a control program repeatedly executed by electronic controller 40 when electronic controller 40 is started. Here, the control program is repeatedly executed until the power of electronic controller 40 is shut off, but it may be repeatedly executed until determination of engine stall is made.

In step 1 (that is abbreviated to as "S1" in drawings, the same rule is applied hereinafter), electronic controller 40 judges whether or not there is a stop instruction of engine 10, by, for example, reading a signal of a starter switch from engine controller 52 and judging whether or not the signal has changed from ON to OFF. If electronic controller 40 judges that there is a stop instruction of engine 10 (Yes), it advances the process to step 2, and if it judges that there is no stop instruction of engine 10 (No), it advances the process to step 3.

In step 2, electronic controller 40 executes a subroutine (the detail will be described later) for a control performed at a time of stopping the engine.

In step 3, electronic controller 40 determines whether or not there is a start instruction of engine 10, by, for example, reading a signal of a starter switch from engine controller 52 and determining whether or not the signal has changed from OFF to ON. If electronic controller 40 determines that there is a start instruction of engine 10 (Yes), the process proceeds to step 4, and if electronic controller 40 determines that there is no start instruction of engine 10 (No), the process proceeds to step 5.

In step 4, electronic controller 40 executes a subroutine (the detail will be described later) for a control performed at a time of starting the engine.

In step 5, electronic controller 40 executes a subroutine (the detail will be described later) for a control performed during a normal time. That is, this subroutine is not executed at a time of stopping the engine or at a time of starting the engine; however, this subroutine is executed during operating of the engine.

According to such a main routine, when there is an engine stop instruction, control performed at a time of stopping the engine is executed and when there is an engine start instruction, control performed at a time of starting the engine is executed. Furthermore, when there is no engine stop instruction or engine start instruction, a control performed during normal operation, that is, during operating of the engine, is executed.

Figure 4:
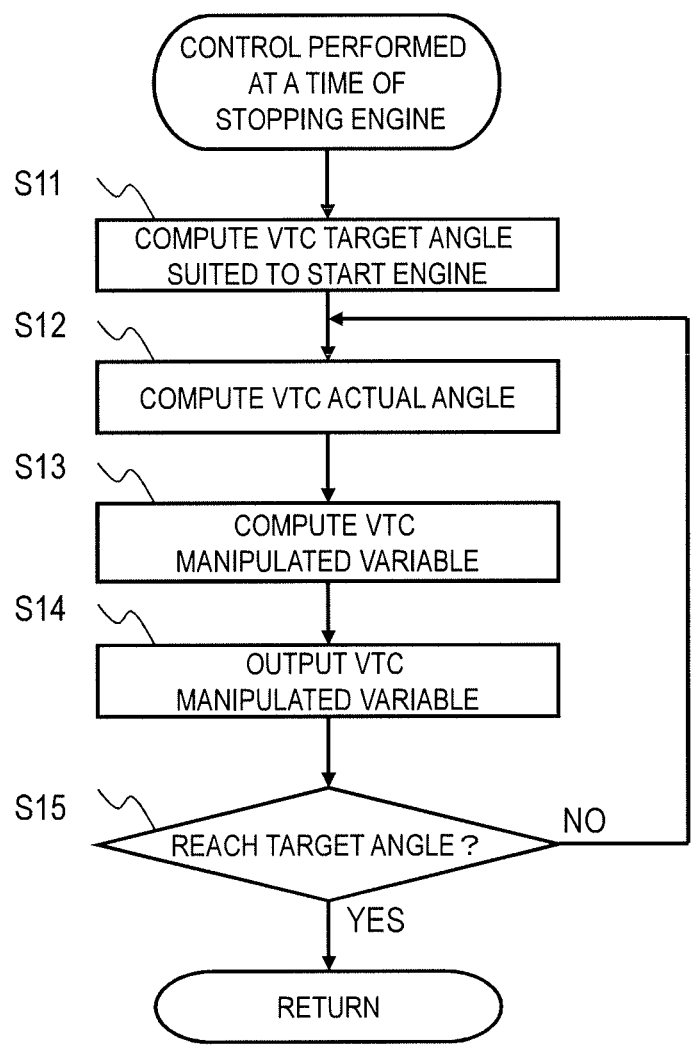
FIG. 4 is a flowchart illustrating a subroutine of a control program executed at a time of stopping the engine.

FIG. 4 illustrates an example of subroutine for a control performed at a time of stopping the engine, which is executed by electronic controller 40

In step 11, electronic controller 40 computes a target angle of VTC 38 suited to start of engine 10 by, for example, reading out a control value from a flash ROM (Read Only Memory). Here, the target angle of VTC 38 may, for example, be an angle at which both of improvement of fuel efficiency by delayed closing of intake valve 20 and engine-start performance are satisfied.

In step 12, electronic controller 40 computes an actual angle of VTC 38 (actual angle rotated from a reference position). That is, electronic controller 40 respectively reads a rotation angle $\theta_{CRK}$ of the crank shaft and a rotation angle $\theta_{CAM}$ of intake cam shaft 36 from a crank angle sensor 46 and a cam angle sensor 48. Then electronic controller 40 computes an actual angle of VTC 38, a positive value of which indicates the angle is on an advance side, by, for example, subtracting rotation angle $\theta_{CRK}$ of the crank shaft from rotation angle $\theta_{CAM}$ of intake cam shaft 36.

In step 13, electronic controller 40 computes a manipulated variable of VTC 38 (for example, a voltage applied to electric motor 38B and its duty ratio etc.) based on a deviation between the target angle and the actual angle of VTC 30.

In step 14, electronic controller 40 outputs the manipulated variable of VTC 38 to electric motor 38B being an actuator.

In step 15, electronic controller 40 determines whether or not the actual angle of VTC 38 has reached the target angle. Then, if electronic controller 40 determines that the actual angle is reached the target angle, the process is determined (Yes), and if electronic controller 40 determines that the actual angle is not reached the target angle, the process returns to step 12 (No).

According to such a control performed at a time of stopping the engine, the angle of VTC is changed to a target angle suited to start of engine 10. Accordingly, in a case of restarting engine 10, it is possible to satisfy both improvement of fuel efficiency of engine 10 and engine-start performance.

Here, when the process for converging the actual angle of VTC 38 to the target angle is carried out after OFF of starter key is detected by engine controller 52 and before engine 10 stops, it is possible to reduce the influence of cam torque. When the electric motor 38B of VTC 38 can produce a sufficient torque, this process may be carried out after the stop of the engine since the motor can change the actual angle of VTC 38 to the target angle even after engine 10 stops.

Figure 5:
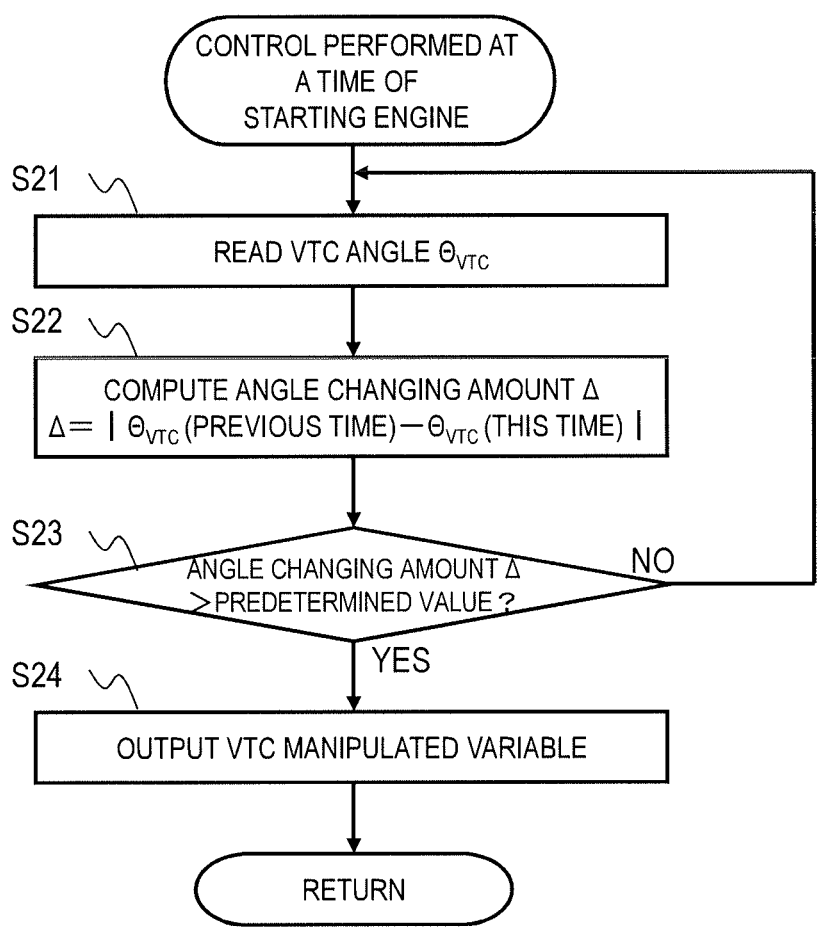
FIG. 5 is a flowchart illustrating a subroutine of a control program executed at a time of starting the engine.

FIG. 5 illustrates an example of subroutine for a control performed at a time of starting the engine, which is executed by electronic controller 40. Here, with regard to processes common to those of the flowchart illustrated in FIG. 4, their explanations are simplified to avoid duplication of explanation (the same rule is applied hereinafter).

In step 21, electronic controller 40 reads VTC angle $\theta_{VTC}$ from VTC angle sensor 50.

In step 22, electronic controller 40 computes a changing amount (angle changing amount) $\Delta$ of VTC angle $\theta_{VTC}$ changed in a control cycle (control interval). That is, electronic controller 40 obtains the absolute value of the difference between the VTC angle $\theta_{VTC}$ detected at last time and the VTC angle $\theta_{VTC}$ detected at this time, and designates this vale as an angle changing amount $\Delta$.

In step 23, electronic controller 40 determines whether or not angle changing amount $\Delta$ is greater than a predetermined value. Here, the predetermined value is a threshold for determining whether or not engine 10 is started based on the angle changing amount, and for example, it is a value greater than an angle detection error of VTC angle sensor 50. If electronic controller 40 determines that angle changing amount $\Delta$ is greater than the predetermined value, the process proceeds to step 24 (Yes), and if electronic controller 40 determines that angle changing amount $\Delta$ is equal to or less than the predetermined value, the process returns to step 21 (No).

In step 24, electronic controller 40 computes a manipulated variable of VTC 38 based on the deviation between a target angle and VTC angle $\theta_{VTC}$ at a time of starting VTC 38, and outputs the manipulated variable to electric motor 38B being an actuator. In short, electronic controller 40 makes VTC angle $\theta_{VTC}$ be converged to the target angle based on a deviation between the target angle of VTC 38 and VTC angle $\theta_{VTC}$. Here, the process of step 24 is repeatedly executed until rotation of the crank shaft is detected by an output of crank angle sensor 46.

Figure 6:
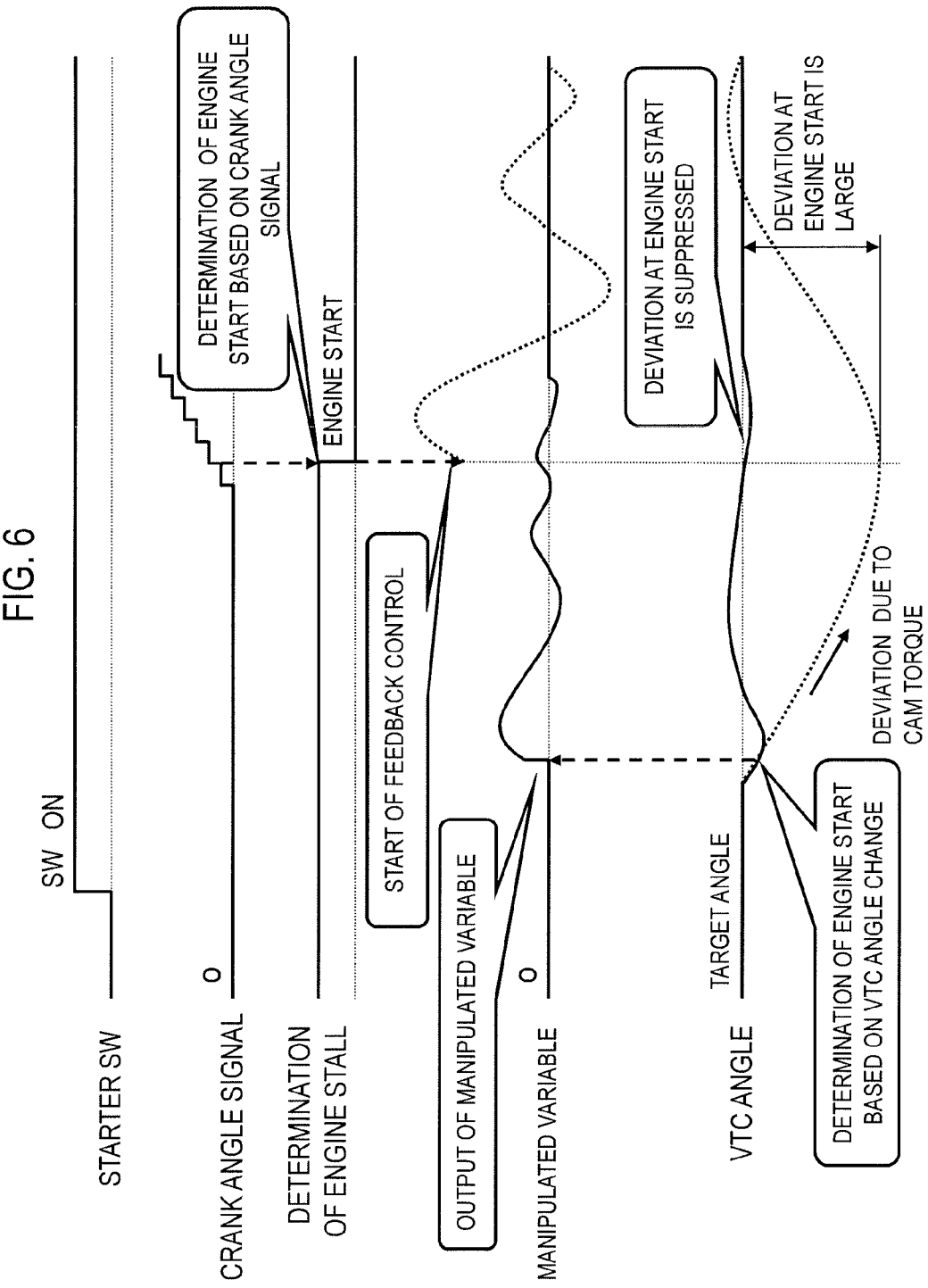
FIG. 6 is a timing chart illustrating actuations and effects of the control at the time of starting the engine.

According to the control performed at the time of starting the engine, if angle changing amount $\Delta$ of valve timing by VTC 38 becomes greater than a predetermined value within a period from a start operation of engine 10 to a detection of rotation of the crank shaft, a manipulated variable of VTC 38 according to the deviation between the target angle and VTC angle $\theta_{VTC}$ is output to electric motor 38B. That is, when the starter switch is turned ON to perform a start operation, cranking is started by a starter, but since an angle detection cycle in a low rotation region of crank angle sensor 46 for detecting the rotation angle of the crank shaft is long, a delay of engine start determination occurs as illustrated in FIG. 6. However, since the crank shaft starts to rotate before the engine start determination is made by the crank angle signal, intake cam shaft 36 rotates to change VTC angle $\theta_{VTC}$. When changing amount of VTC angle $\theta_{VTC}$ becomes greater than a predetermined value that is greater than an angle detection error of VTC angle sensor 50, since start of rotation of the crank shaft is determined, a manipulated variable according to the deviation between the target angle of VTC 38 and VTC angle $\theta_{VTC}$ is output to electric motor 38B.

Accordingly, when VTC angle $\theta_{VTC}$ starts to deviate from the target angle, VTC 38 is actuated by a manipulated variable according to the deviation amount, and controlled so that VTC angle $\theta_{VRC}$ converges to the target angle. When an engine start determination is made by the crank angle signal, as described later, VTC 38 is feedback-controlled based on outputs of crank angle sensor 46 and cam angle sensor 48.

Figure 7:
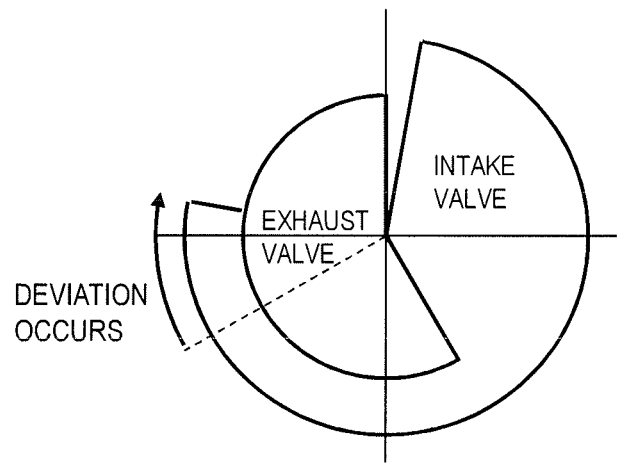
FIG. 7 is a view illustrating a control state of valve timing immediately after starting an engine in a conventional technique.
Figure 8:
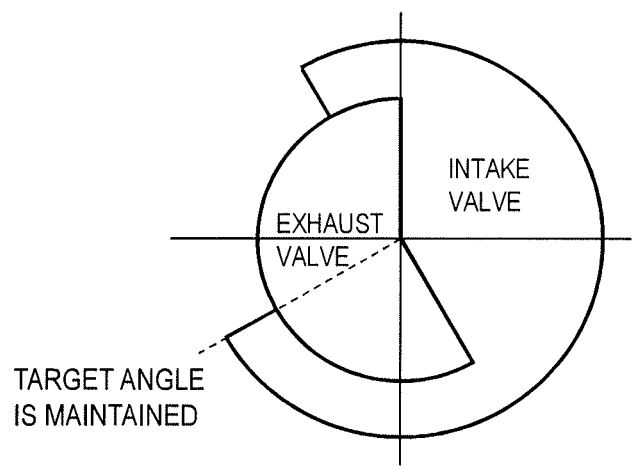
FIG. 8 is a view illustrating a control state of valve timing immediately after starting an engine in this technique.

Accordingly, even in a period from engine start operation to detection of rotation of the crank shaft, if the engine is actually started, control of VTC 38 is carried out. Thus, as illustrated in FIG. 7, even if the valve timing is deviated due to the cam torque at the time of starting the engine, the valve timing is controlled to the target angle as illustrated in FIG. 8. Accordingly, the VTC angle is maintained to be one suited to start of the engine.

Figure 9:
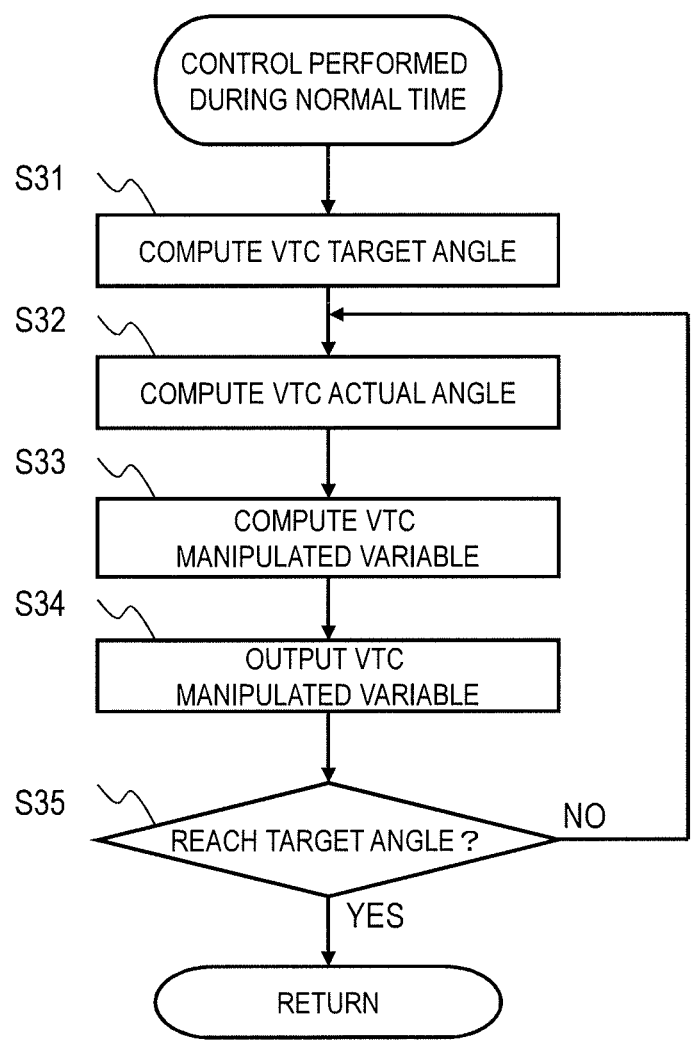
FIG. 9 is a flowchart illustrating a subroutine of a control program executed during normal operation.

FIG. 9 illustrates an example of subroutine for a control performed for a normal time, which is executed by electronic controller 40.

In step 31, electronic controller 40 computes a target angle of VTC 38 according to an engine operation state. That is, electronic controller 40 respectively reads intake flow rate Q, water temperature Tw and rotation speed Ne from intake flow rate sensor 14, water temperature sensor 42 and rotation speed sensor 44. Then, electronic controller 40 refers, for example, to a table including a target angle corresponding to every rotation speed and every intake flow rate at every water temperature, and obtains a target angle according to water temperature Tw, rotation speed Ne and intake flow rate Q.

In step 32, electronic controller 40 computes an actual angle of VTC 38 by executing a process similar to that of step 12.

In step 33, electronic controller 40 computes a manipulated variable of VTC 38 based on the deviation between the actual angle and the target angle of VTC 38.

In step 34, electronic controller 40 outputs the manipulated variable of VTC 38 to electric motor 38B.

In step 35, electronic controller 40 determines whether or not the actual angle of VTC 38 is reached the target angle. If electronic controller determines that the actual angle is reached the target angle, the process is terminated (Yes), and if electronic controller 40 judges that the actual angle is not reached the target angle, the process returns to step 32 (No).

According to the abovementioned control performed during normal time, VTC 38 is controlled to a target angle according to an engine operation state. Accordingly, by appropriately setting the target angle according to the engine operation state, it is possible to improve, for example, the response, the torque, the fuel efficiency, etc.

FIG. 10 illustrates another example of subroutine for a control performed at a time of starting the engine, which is executed by electronic controller 40.

In step 41, electronic controller 40 computes a cam torque at the time of starting the engine. That is, electronic controller 40 respectively reads a rotation angle $\theta_{CRK}$ of the crank shaft, a rotation angle $\theta_{CAM}$ of intake cam shaft 36 and VTC angle $\theta_{VTC}$ from a crank angle sensor 46, a cam angle sensor 48 and a VTC angle sensor 50, and based on them, the electronic controller estimates a cam torque. Here, the cam torque at the time of starting the engine can be obtained by referring, for example, to a table including an estimated value corresponding to every rotation angle of crank shaft, every rotation angle of intake cam shaft 36, and every VTC angle. Here, the cam torque at the time of starting the engine may be obtained from a distortion of intake cam shaft 36.

In step 42, electronic controller 40 computes the minimum value of a manipulated variable of VTC 38 enabling intake cam shaft to overcome the cam torque and thus be rotated. That is, electronic controller 40 computes a manipulated variable which causes "cam torque <(is less than) motor torque" as the minimum amount of the manipulated variable of VTC 38.

In step 43, electronic controller 40 reads VTC angle $\theta_{VTC}$ from VTC angle sensor 50.

In step 44, electronic controller 40 computes a changing amount $\Delta$ of VTC angle $\theta_{VTC}$ that has changed during a control cycle. That is, electronic controller 40 obtains an absolute value of the difference between VTC angle $\theta_{VTC}$ detected at previous time and VTC angle $\theta_{VTC}$ detected at this time, and designates this value as an angle changing amount $\Delta$.

In step 45, electronic controller 40 determines whether or not angle changing amount $\Delta$ is greater than a predetermined value. Then if electronic controller determines that angle changing amount $\Delta$ is greater than the predetermined value, the process proceeds to step 46 (Yes), but if electronic controller 40 determines that angle changing amount $\Delta$ is equal to or less than the predetermined value, the process returns to step 43 (No).

In step 46, electronic controller 40 computes a manipulated variable of VTC 38 based on the deviation between the target angle of at the time of starting of the engine and VTC angle $\theta_{VTC}$.

In step 47, electronic controller 40 corrects the manipulated variable of VTC 38 as the case requires. That is, electronic controller 40 compares the manipulated variable of VTC 38 with the minimum value of the manipulated variable of VTC 38, and if "manipulated variable <(is less than) minimum value of manipulated variable" is satisfied, the manipulated variable of VTC 38 is changed to be the minimum amount of manipulated variable. Here, the processes of steps 41 and 42 may be carried out just before the correction of the manipulated variable of VTC 38 in order to improve control accuracy.

In step 48, electronic controller 40 reads a battery voltage VB from a voltage meter, not illustrated, and determines whether or not battery voltage VB is higher than a predetermined voltage. Then, if electronic controller 40 determines that battery voltage VB is higher than the predetermined voltage, the process proceeds to step 49 (Yes), but if electronic controller 40 determines that battery voltage VB is equal to or less than the predetermined voltage, the process waits (No). Here, the predetermined voltage may, for example, be a predetermined constant, a value according to lubricant oil temperature or water temperature, a value according to charge state or deterioration state of the battery, or an appropriately combined value of them. Here, the process of step 48 may be omitted.

In step 49, electronic controller 40 outputs the manipulated variable of VTC 38 to electric motor 38B being an actuator so that VTC angle $\theta_{VTC}$ is converged to the target angle. Here, the process of step 49 is repeatedly executed until rotation of the crank shaft is detected by the output of crank angle sensor 46.

According to the control performed at the time of starting the engine, in addition to the operations and effects illustrated in FIG. 5, the manipulated variable of VTC 38 output to electric motor 38B is a value sufficient to overcome the cam torque at the time of starting the engine. Accordingly, it is possible to overcome the cam torque to actuate VTC 38, thus facilitating control of VTC 38 to the target angle. Furthermore, since the manipulated variable of VTC 38 is output when battery voltage VB is higher than the predetermined voltage, it is possible to prevent VTC 38 from inappropriate controlling in a state the motor torque is insufficient.

Here, in the control at the time of starting the engine, the controls illustrated in FIGS. 5 and 9 may be appropriately combined.

In these controls, angle changing amount $\Delta$ is defined as a changing amount in a control cycle, but it may be a changing amount in a unit time or a combination of a changing amount in a control cycle and a changing amount in a unit time. The predetermined value for determining whether or not engine 10 is started is not limited to a predetermined constant, but it may be a value according to lubricant oil temperature or water temperature, a value according to a cam torque, a value according to charge state or deterioration state of the battery, or a combined value of them. Here, when the predetermined value is the value according to lubricant oil temperature or water temperature, it is possible to improve detection ratio by setting the value so that it becomes smaller as the temperature becomes lower. Furthermore, when the predetermined value is the value according to cam torque, it is possible to achieve early detection by setting the value so that it becomes smaller as the cam torque becomes smaller.

Here, a part of the matters described in the embodiments may be replaced or appropriately combined.

The entire contents of Japanese Patent Application No. 2012-206300, filed Sep. 19, 2012, are incorporated herein by reference.

While only selected embodiments have been chosen to illustrate the present invention, it will be apparent to those skilled in the art from this disclosure that various change and modification can be made herein without departing from the scope of the invention as defined in the appended claims.

Furthermore, the foregoing descriptions of the embodiments according to the present invention are provided for illustration only, and not for the purpose of limiting the invention as defined by the appended claims and their equivalents.

What is claimed is:

1. An apparatus for controlling a variable valve timing mechanism, comprising:
    a sensor that detects a changing amount of valve timing produced by a variable valve timing mechanism; and
    an electronic controller including a microcomputer, the electronic controller converging the valve timing to a target changing amount that facilitates start of an engine, based on a deviation between an output of the sensor and the target changing amount, wherein
    the valve timing is converged during a period of time: i) beginning when a decision to start operation of the engine is made, and ii) ending when rotation of a crankshaft is detected.

2. The apparatus for controlling a variable valve timing mechanism according to claim 1, wherein the electronic controller is configured to output a manipulated variable of the valve timing to an electric actuator of the variable valve timing mechanism.

3. The apparatus for controlling a variable valve timing mechanism according to claim 2, wherein the electronic controller is configured to estimate a cam torque from a rotation angle of the crank shaft, a rotation angle of the cam shaft and a changing amount of the valve timing, and correct the manipulated variable of the valve timing according to the estimated cam torque.

4. The apparatus for controlling a variable valve timing mechanism according to claim 2, wherein the electronic controller is configured to estimate a cam torque from a distortion of the cam shaft, and correct the manipulated variable of the valve timing according to the estimated cam torque.

5. The apparatus for controlling a variable valve timing mechanism according to claim 3, wherein when the variable valve timing mechanism is configured to change the valve timing by the electric actuator, the electronic controller is configured to correct the manipulated variable of the valve timing when a battery voltage is equal to or greater than a predetermined voltage.

6. The apparatus for controlling a variable valve timing mechanism according to claim 5, wherein the electronic controller is configured to set the predetermined voltage according to at least one of lubricant oil temperature, cooling water temperature, charge state of the battery and deterioration state of the battery.

7. The apparatus for controlling a variable valve timing mechanism according to claim 1, wherein the sensor outputs a rotation angle continuously at every unit angle.

8. The apparatus for controlling a variable valve timing mechanism according to claim 1, wherein the electronic controller is configured to converge the valve timing to the target changing amount according to the deviation between a changing amount of the output of the sensor and the target changing amount when the output of the sensor becomes greater than a predetermined value.

9. A method for controlling a variable valve timing mechanism, comprising:
controlling the variable valve timing mechanism by an electronic controller including a microcomputer, so as to converge a valve timing to a target changing amount that facilitates start of an engine, based on a deviation between the target changing amount and an output of a sensor for detecting a changing amount of the valve timing; and
converging the valve timing during a period of time: i) beginning when a decision to start operation of the engine is made, and ii) ending when rotation of a crankshaft is detected.

10. The method for controlling a variable valve timing mechanism according to claim 9, wherein the electronic controller outputs a manipulated variable of the valve timing to an electric actuator of the variable valve timing mechanism.

11. The method for controlling a variable valve timing mechanism according to claim 10, wherein the electronic controller estimates a cam torque from a rotation angle of the crank shaft, a rotation angle of the cam shaft and a changing amount of the valve timing, and corrects the manipulated variable of the valve timing according to the estimated cam torque.

12. The method for controlling a variable valve timing mechanism according to claim 10, wherein the electronic controller estimates a cam torque from a distortion of the cam shaft, and corrects the manipulated variable of the valve timing according to the estimated cam torque.

13. The method for controlling a variable valve timing mechanism according to claim 11, wherein when the variable valve timing mechanism changes the valve timing by an electric actuator, the electronic controller corrects the manipulated variable of the valve timing when a battery voltage is equal to or greater than a predetermined voltage.

14. The method for controlling a variable valve timing mechanism according to claim 13, wherein the electronic controller sets the predetermined voltage according to at least one of lubricant oil temperature, cooling water temperature, charge state of the battery and deterioration state of the battery.

15. The method for controlling a variable valve timing mechanism according to claim 9, wherein the sensor outputs a rotation angle continuously at every unit angle.

16. The method for controlling a variable valve timing mechanism according to claim 9, wherein the electronic controller converges the valve timing to the target changing amount according to the deviation between a changing amount of the output of the sensor and the target changing amount when the output of the sensor becomes greater than a predetermined value.

17. An system for controlling engine timing, comprising:
a variable valve timing mechanism;
a sensor that detects a changing amount of valve timing produced by the variable valve timing mechanism;
an electric motor; and
an electronic controller including a microcomputer, the electronic controller performing a control process that outputs a manipulated variable to the electric motor so that a valve timing control system angle is converged to a target angle, wherein
the target angle facilitates start of an engine, and
the control process is repeatedly executed during a period of time in which no rotation of the crankshaft is detected until rotation of the crankshaft is detected.

* * * * *